(12) United States Patent
Noritake et al.

(10) Patent No.: US 6,822,645 B2
(45) Date of Patent: Nov. 23, 2004

(54) DRIVING DEVICE FOR DISPLAY DEVICE

(75) Inventors: Kazuto Noritake, Gifu (JP); Yusuke Tsutsui, Hashima (JP)

(73) Assignee: Sanyo Electric Co., Ltd., Osaka (JP)

(*) Notice: Subject to any disclaimer, the term of this patent is extended or adjusted under 35 U.S.C. 154(b) by 55 days.

(21) Appl. No.: 09/967,875

(22) Filed: Sep. 28, 2001

(65) Prior Publication Data

US 2002/0060673 A1 May 23, 2002

(30) Foreign Application Priority Data

Sep. 29, 2000 (JP) .................................... 2000-300836

(51) Int. Cl.$^7$ ................................................ G09G 5/00
(52) U.S. Cl. ......................... 345/211; 345/99; 345/204
(58) Field of Search ........................... 345/87, 90, 92, 345/93, 94, 95, 98, 99, 100, 204, 211, 214, 205, 206, 102

(56) References Cited

U.S. PATENT DOCUMENTS

| | | | |
|---|---|---|---|
| 5,475,402 A | 12/1995 | Hijikata et al. | |
| 5,598,565 A | 1/1997 | Reinhardt | |
| 5,680,300 A | 10/1997 | Szepesi et al. | |
| 5,867,140 A | 2/1999 | Rader | |
| 5,910,891 A | 6/1999 | Jo | |
| 6,107,981 A | * 8/2000 | Fujita | 345/95 |
| 6,229,530 B1 | * 5/2001 | Ushiki | 345/204 |
| 6,323,851 B1 | * 11/2001 | Nakanishi | 345/211 |
| 6,462,725 B1 | * 10/2002 | Orisaka | 345/98 |

FOREIGN PATENT DOCUMENTS

| | | |
|---|---|---|
| JP | 04-095995 | 3/1992 |
| JP | 10-254414 | 9/1998 |

OTHER PUBLICATIONS

English and Japanese Translation of Taiwan Office Action of Nov. 13, 2003 for corresponding Taiwan Application No. 090123707.
Taiwan Utility Model Publication No. 237163 with English and Japanese translation thereof, published Dec. 21, 1994.
Korean Office Action with English and Japanese translation thereof for corresponding Korean Application No. 10-2001-0060475.
Korean Patent Publication No. 1999-0047069 with English and Japanese translation of claims and abstract thereof, published Jul. 5, 1992.
Japanese Patent Laid-Open Publication No. Hei 11-231279 with corresponding U.S. Pat. 6,229,530.
Korean Pat. Publication No. 1999-0056665, published Jul. 15, 1999, with Japanese and English translation of claims and abstract thereof.
Japanese Patent Laid-Open Publication No. Hei 10-164840 with corresponding U.S. Pat. No. 5,910,891.
Japanese Patent Laid-Open Publication No. Hei 11-202842 with English translation thereof.

* cited by examiner

Primary Examiner—Bipin Shalwala
Assistant Examiner—Mansour M. Said
(74) Attorney, Agent, or Firm—Hogan & Hartson, LLP

(57) ABSTRACT

The supply voltage to a driving circuit (100) and LCD (200) generated by a power supply circuit (350) is controlled to be periodically turned on and off during a power save mode, using a timer circuit (260) or timer such as a counting circuit. In this manner, during the power save mode, the power consumption can be reduced by turning off the power supply, and, at the same time, the display can be periodically shown without any further manipulation. By suspending the output of the gate selection signals to the display panels before the control to turn off the power supply, the display immediately before the turn off operation can be maintained even after the power supply is turned off.

6 Claims, 8 Drawing Sheets

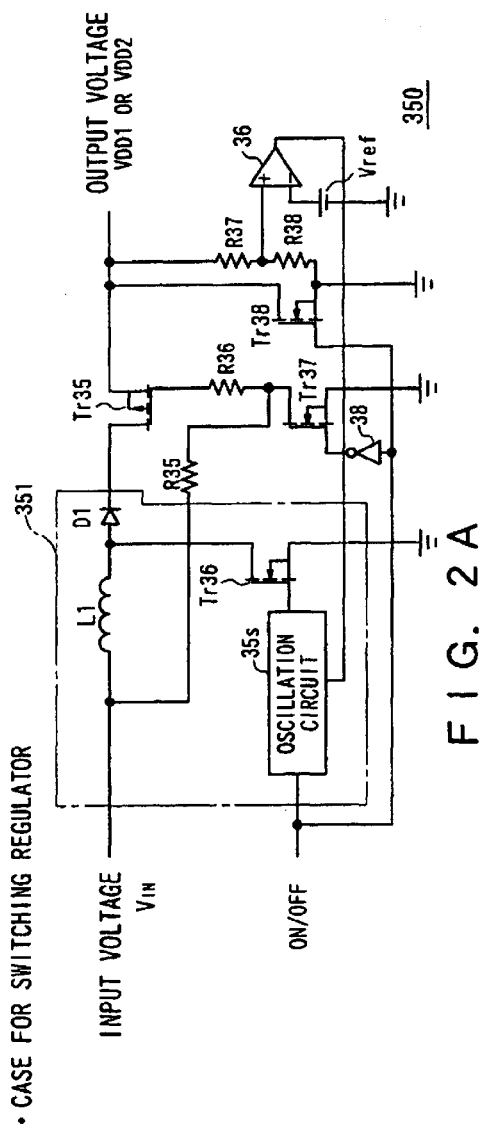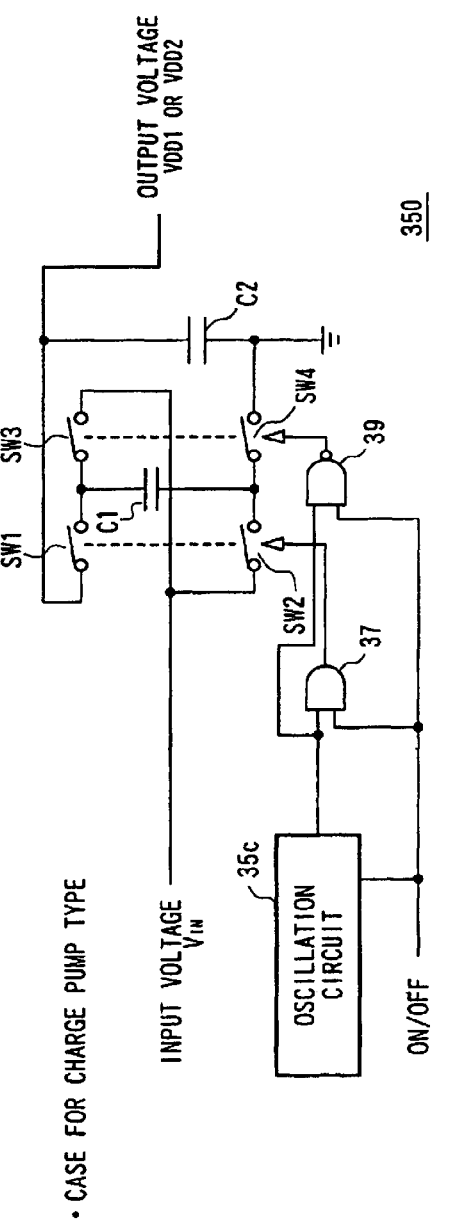

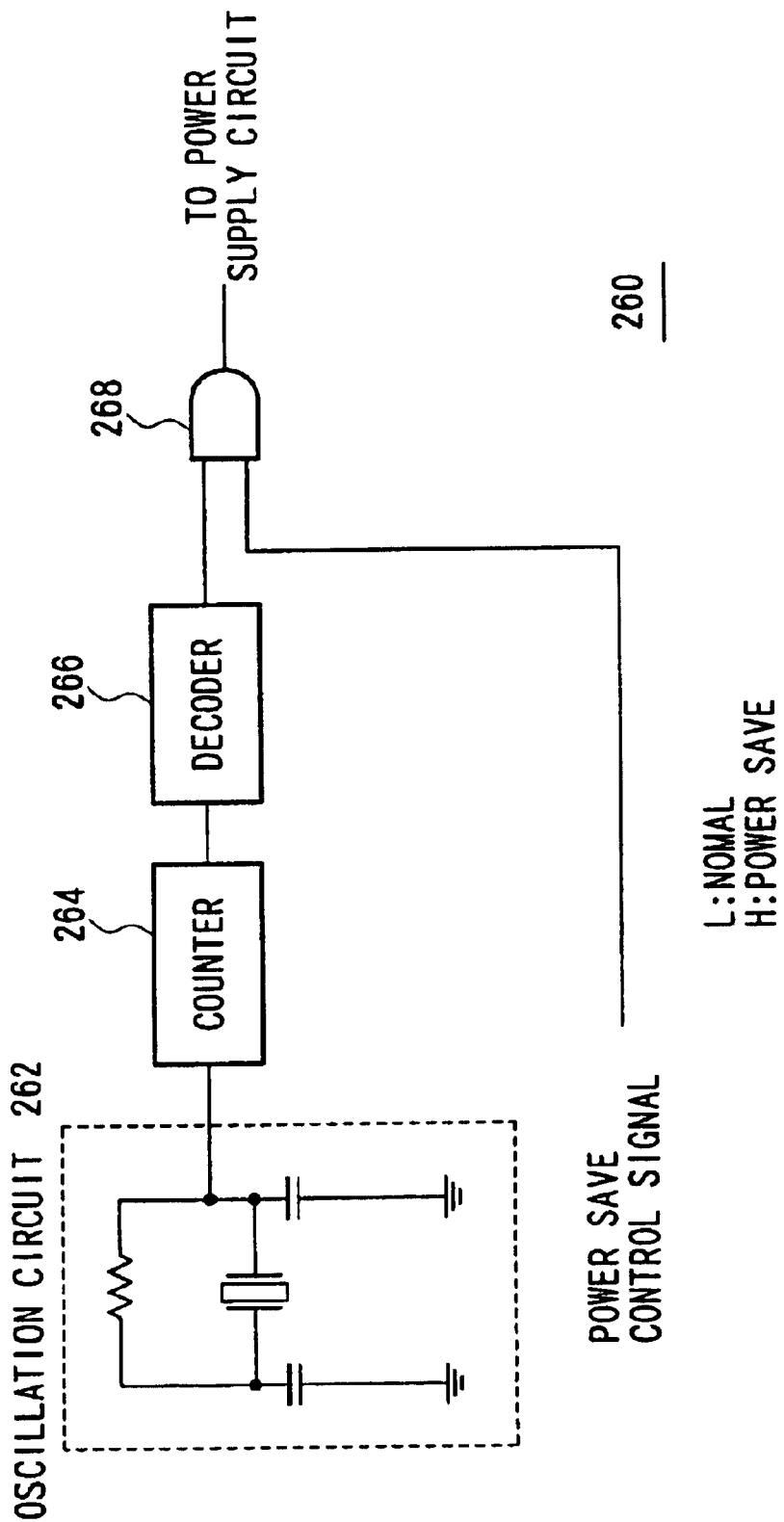

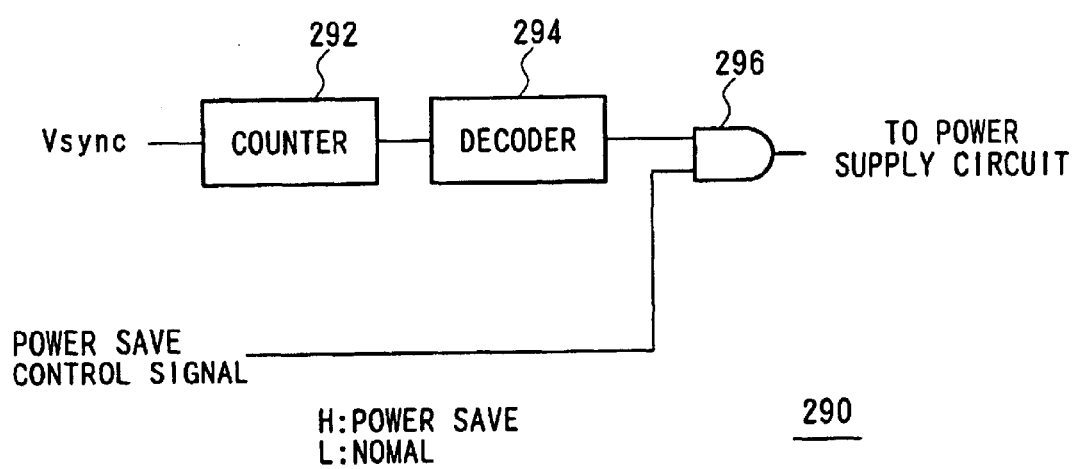
F I G. 5

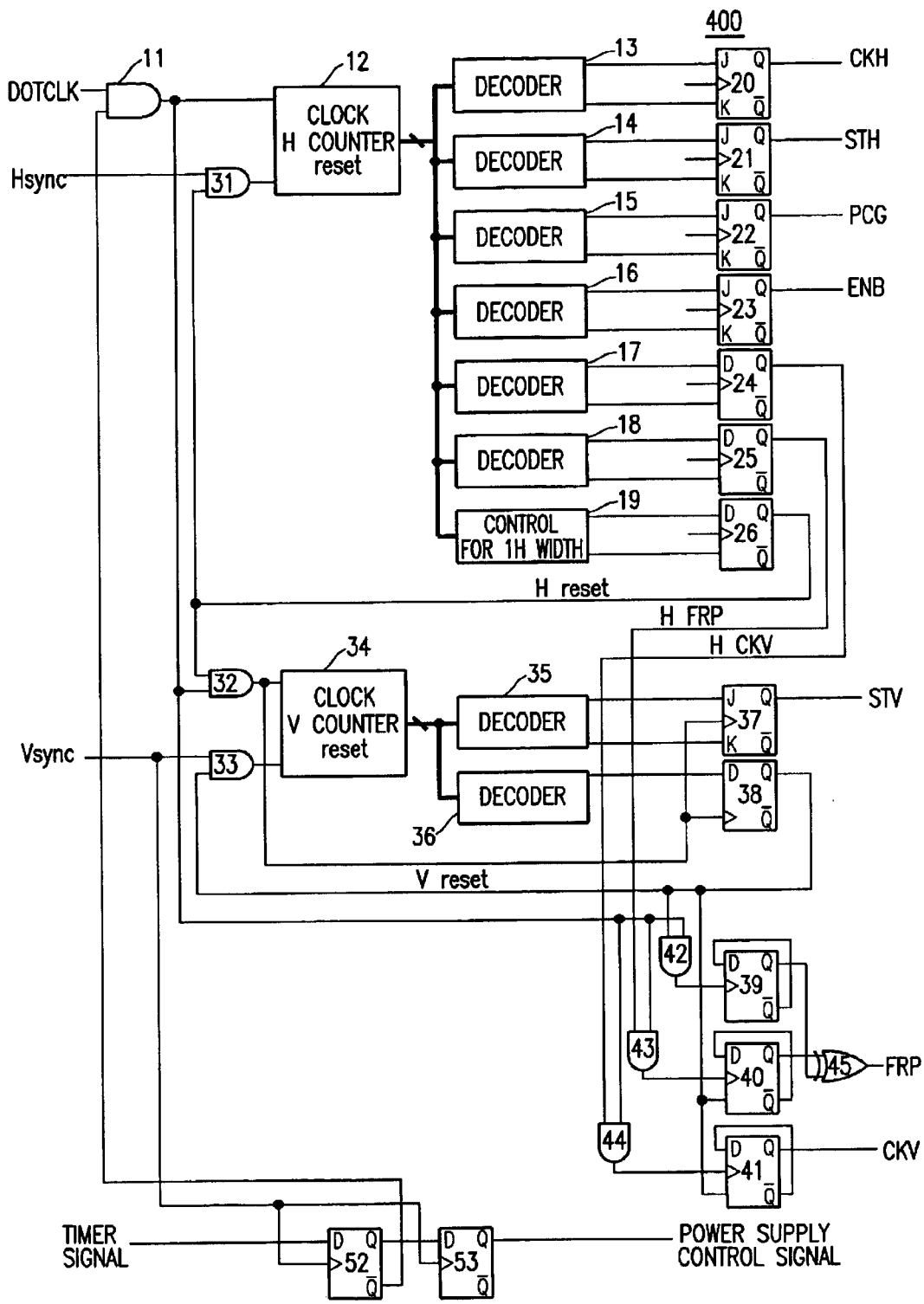
F I G. 7

DRIVING DEVICE FOR DISPLAY DEVICE

BACKGROUND OF THE INVENTION

1. Field of the Invention

The present invention relates to a display device and in particular to a driving device for a display device adapted for a power save request.

2. Description of the Related Art

Flat panel display devices such as liquid crystal and organic EL display devices are generally thin, lightweight, and energy efficient. Because of these characteristics, flat panel display devices are suited for use as display devices for portable devices, such as mobile phones, and have therefore come to be widely employed in many such portable devices.

A liquid crystal display device comprises a liquid crystal display (LCD) panel constructed by sealing liquid crystal between a pair of substrates, a driving circuit for driving the LCD panel, and a power supply circuit for supplying the required supply voltages to the driving circuit and LCD panel. Because the LCD is not self-illuminating, a light source is provided at the rear side of the panel in LCDs other than a reflective type LCD, such as transmission type LCD and transflective type LCD.

There is a strong demand for reducing the power consumption in portable instruments such as mobile phones. In order to satisfy this demand, there are techniques employed such as, for example, switching off the light source during waiting periods because the light source consumes the most power.

Where there is a further demand for reducing the power consumption in a display device, the power supply circuit may be controlled to turn off the power supply for the device.

However, when the power supply is turned off during the power save mode, the display device will be unable to display. In a mobile phone, for example, when the power save mode is activated, because the display power supply is controlled to be turned off, information such as the time of day indicated by the internal clock and radio wave conditions cannot be shown, even when desired. If one wishes to see the display, there is a need to manually turn on the display, which is inconvenient.

SUMMARY OF THE INVENTION

The present invention was conceived to solve at least the problem described above, and one object of the present invention is to provide a display device which is adapted for a power save mode, and, at the same time, allows the display to be seen even in the power save mode.

In order to achieve at least the object mentioned above, the present invention is characterized in the following.

According to one aspect of the present invention, there is provided a driving device for a display device, comprising a driving circuit for driving a display panel onto which a plurality of pixels are formed; and a power supply circuit for generating supply voltage for the display panel and the driving circuit; wherein when power save is instructed, the supply voltage supplied to one or both of the display panel and the driving circuit is controlled to be turned on and off with a predetermined period.

According to another aspect of the present invention, it is preferable in the driving device that the driving device further comprises timer and the power supply circuit turns the supply voltage on and off in response to the time measurement result by the timer.

In this manner, the output of supply voltage is controlled to be periodically turned on and off when power save is instructed. When the supply voltage is controlled to be turned off, because the power consumption at the driving circuit or display panel can be shut off, the power consumption of the display device can be reduced. Because the supply voltage is controlled to be periodically turned on during the power save mode, even during the power save mode the user can periodically view the display without any manipulation.

According to another aspect of the present invention, it is preferable in the driving device that the display panel comprises a plurality of pixels, selection lines for selecting the pixels, and data lines for supplying data to the pixels; the driving device further comprises suspension controller for suspending, when a power save is instructed, the output of all selection signals onto the selection lines for selecting the pixels to which data is written; and the supply voltage is controlled to be turned off after the suspension controller has suspended the output of the selection signals.

By controlling the supply voltage to be turned off after suspending the output of the selection signals, for example, in an active matrix type panel wherein a switching element such as a transistor is formed on each pixel, the switching element can be reliably controlled to be turned off before the supply voltage is reduced. The inclusion of the capacitor component enables the data written to the pixel during when the switching element is at "on" state to be retained in each pixel for a predetermined period even after the switching element is turned off. Thus, by first suspending the output of all selection signals to the selection lines and then turning off the supply voltage, the display according to the data maintained till immediately before the turn off operation can be shown at each pixel even when the power supply is turned off, similar to the non-selection period during the normal operation.

With the present invention, it is possible to execute the control to turn off the supply voltage after, for example, 1 vertical scan period has elapsed since the suspension of the output of the selection signals by the suspension controller. In a driving device, the vertical synchronization signal generated every vertical scan period is used for many purposes, and, thus, by controlling the off timing with reference to the vertical scan period, no designated control signal for suspension is needed. Therefore, there is no need for a major circuit alteration to allow for such.

As described above, in the driving device for a display device according to the present invention, the supply voltage can be controlled to be periodically turned on and off with a predetermined period when power save is instructed. Because of this control to turn off the supply voltage, the power consumption at the driving circuit and display panel can be shut off, and, thus, the power consumption in the display device can be reduced. At the same time, because the supply voltage is controlled to turn on automatically at a regular interval in the power save mode, the display can be viewed periodically.

Moreover, according to the present invention, the supply voltage is controlled to be turned off after the output of the selection signals are suspended. Due to the capacitor component of the pixels, each pixel can maintain the display, which has been shown until immediately before the power supply is turned off, for a predetermined amount of time even during the period when the power supply is turned off and no power is consumed.

BRIEF DESCRIPTION OF THE DRAWINGS

FIGS. 2A and 2B are diagrams each showing the structure of the power supply circuit 350 depicted in FIG. 1.

FIG. 3 is a diagram showing the structure of the timer circuit 260 depicted in FIG. 1.

FIG. 5 is a diagram showing a structure of the counting circuit 290 depicted in FIG. 4.

FIG. 7 is a diagram showing the structure of the T/C 400 depicted in FIG. 6.

DESCRIPTION OF PREFERRED EMBODIMENTS

The preferred embodiments of the present invention (referred to as "embodiments" hereinafter) will be described below with reference to the drawings.

[First Embodiment]

Figure 1:
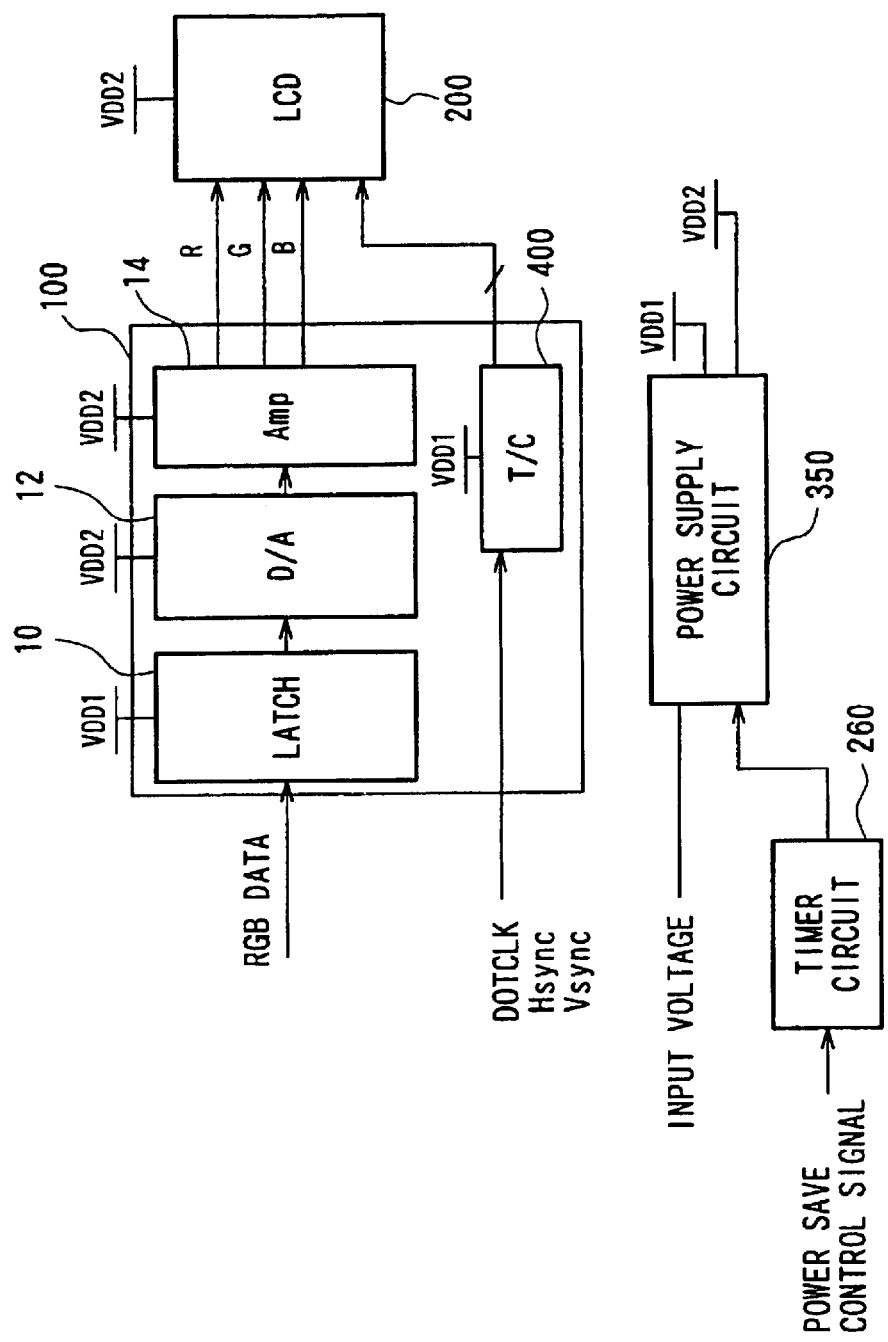
FIG. 1 is a diagram showing the structure of a display device according to a first embodiment of the present invention.

FIG. 1 schematically shows the structure of a display device with a power save mode according to a first embodiment of the present invention. The display device is a flat panel display device such as, for example, an LCD of a mobile phone, and comprises a liquid crystal display (LCD) panel 200 constructed by sealing liquid crystal between a pair of substrates, a driving circuit 100 for driving the LCD panel 200, and a power supply circuit 350 for supplying the required supply voltages to the driving circuit 100 and LCD panel 200. In the first embodiment, the display device further comprises a timer circuit 260.

The timer circuit 260, when supplied with a power save control signal, starts a time counting operation. After a predetermined amount of time has elapsed, the timer circuit 260 supplies a power supply control signal to the power supply circuit 350, which turns the supply voltage off upon reception of the control signal, as is described below.

The driving circuit 100 comprises a latch circuit 10 for latching supplied RGB digital data, a digital-to-analog (D/A) converter circuit 12 for converting the latched data to analog data, an amplifier 14 for amplifying the converted analog data and supplying the amplified data to the liquid crystal display panel 200 as R, G, and B analog display data, and a timing controller (T/C) 400. The T/C 400 generates a timing signal suited for display at the liquid crystal display panel 200 based on timing signals such as a dot clock DOTCLK, horizontal synchronization signal Hsync, and vertical synchronization signal Vsync.

The power supply circuit 350 generates a plurality of supply voltages as necessary. Here, the power supply circuit 350 generates supply voltages VDD1 and VDD2. The supply voltage VDD1 is supplied to the latch circuit 10 for performing digital signal processing and which is constructed from a CMOS logical circuit suited for low voltage driving, and the supply voltage VDD2 of a voltage higher than the supply voltage VDD1 is supplied to the D/A converter circuit 12, amplifier 14, and LCD panel 200.

Structures for the power supply circuit 350 will now be described. FIGS. 2A and 2B respectively show a structure of a related art power supply circuit for generating the voltage VDD2. The power supply circuit 350 shown in FIG. 2A is of switching regulator type and the power supply circuit 350 shown in FIG. 2B is of charge pump type.

The switching regulator type power supply circuit 350 depicted in FIG. 2A comprises a boosting section 351 including a coil L1 and a diode D1 provided, in that order, between the input and output, an oscillation circuit 35s for oscillating a predetermined pulse signal, and a transistor Tr36 which receives the pulse signal from the oscillation circuit 35s at its gate. The power supply circuit 350 boosts the input voltage $V_{IN}$ at the coil L1 and diode D1 by controlling the transistor Tr36 on and off using the pulse signal from the oscillation circuit 35s. The obtained boosted supply voltage VDD2 is then supplied to the liquid crystal driving circuit 100 and to the LCD panel 200 as the operation power supply. The power supply circuit 350 further comprises voltage dividing resistive elements R37 and R38 between its output end and the ground. A comparator 36 compares the divided voltage between the resistive elements R37 and R38 with a reference voltage Vref, and outputs a comparison signal. By controlling the oscillation frequency of the oscillation circuit 35s based on the comparison signal corresponding to the output voltage VDD2 from the comparator 36, the overall circuit is controlled so that the output voltage VDD2 remains stable.

The charge pump type power supply circuit 350 depicted in FIG. 2B comprises two capacitors C1 and C2, capacitor switches SW1 through SW4 for switching the supply route of the input voltage to the capacitors, an oscillation circuit 35c for generating a pulse signal for controlling the switching of the switches SW1 through SW4, an AND gate 37, and a NAND gate 39.

The oscillation circuit 35c generates a pulse signal having, for example, a duty ratio of 1/2. The pulse signal is supplied to the switches SW1 and SW2 via the AND gate 37 and to the switches SW3 and SW4 via the NAND gate 39, so that the groups of switches SW1 and SW2 and SW3 and SW4 are alternately opened and closed.

When switches SW3 and SW4 are closed, the input voltage $V_{IN}$ is applied to the upper electrode of the capacitor C1, the lower electrode becomes the ground (GND), and, thus, the capacitor C1 is charged. At the next timing, the switches SW3 and SW4 are opened and the switches SW1 and SW2 are closed. In this case, the input voltage $V_{IN}$ is applied to the lower electrode of the capacitor C1, the voltage at the upper electrode of the capacitor C1 is boosted to a voltage of twice the input voltage $V_{IN}$, and the output voltage VDD2 having a voltage of twice the input voltage $V_{IN}$ is obtained at the output terminal provided between the upper electrodes of the capacitors C1 and C2.

Each of the power supply circuits 350 having the above structures are adapted for a power save mode. In the first embodiment, during the power save mode, the supply voltage is periodically turned on and off. The durations for turning on and off are controlled by the timer circuit 260 by measuring time.

FIG. 3 shows an example structure of the timer circuit 260 according to the first embodiment. The timer circuit 260 comprises an oscillation circuit 262, a counter 264, a decoder 266, and an AND gate 268. The counter 264 counts the pulses which are periodically output from the oscillation circuit 262 and outputs a count value. The decoder 266 analyzes the count value and supplies a signal of either H level or L level to one input terminal of the AND gate 268 depending on the count value.

A power save control signal is supplied to the other input terminal of the AND gate 268, so that when the power save control signal is at H level, indicating the power save mode, the output of the AND gate 268 is identical to the output level of the decoder circuit 266 and when the power save control signal is at L level, indicating the normal mode, the output of the AND gate 268 is fixed at L level.

Both power supply circuits 350 in FIGS. 2A and 2B receive the output of the AND gate of the timer circuit 260 as an ON/OFF signal. In the case of the power supply circuit 350 shown in FIG. 2A, when the output of the AND gate 268 is at L level, the circuit operates normally and generates supply voltages VDD1 and VDD2. When, on the other hand, the output of the AND gate 268 becomes H level, the generation of the supply voltages is suspended.

In the power supply circuit 350 of FIG. 2A, when the ON/OFF signal is at L level, the oscillation circuit 35s performs oscillation operation. The transistor Tr37 is turned on and, subsequently, the transistor Tr35 provided at the input-to-output route is also turned on. At this point, the transistor Tr38 connected between the output terminal of the power supply circuit 350 and the ground is controlled to be turned off. Thus, when the ON/OFF signal is at L level, the voltages VDD1 and VDD2 obtained by boosting the input voltage $V_{IN}$ at the boosting section 351 are output.

When, on the other hand, the ON/OFF signal is at H level, the oscillation circuit 35s suspends its oscillation operation, the transistor Tr37 is turned off, the transistor Tr35 is controlled to be turned off, and, thus, the output from the boosting section 351 is shut out. Moreover, because the transistor Tr38 is turned on, the output terminal is connected to ground. The output of the power supply circuit 350 becomes 0V, that is, the power supply circuit 350 is controlled to be turned off.

The power supply circuit 350 depicted in FIG. 2B, on the other hand, receives an inverted output of the AND gate 268 of the timer circuit 260 as an ON/OFF signal. When the output of the AND gate 268 is at L level (i.e., when the inverted output is at H level), the oscillation circuit 35c generates a normal pulse signal. As a result, the groups of switches SW1 and SW2, and SW3 and SW4 are alternately controlled to be switched, the charge pump is enabled, and an output voltage VDD2 or VDD1 having a higher voltage than the input voltage $V_{IN}$ can be obtained. When the output of the AND gate 268 of the timer circuit 260 is at H level (i.e., when the inverted output is at L level), operation of the oscillation circuit 35c is suspended, the output of the AND gate 37 is fixed at L level, and the output of the NAND gate 39 is fixed at H level. Because of this, the capacitors C1 and C2 are discharged, output voltage is reduced, and, thus, the power supply circuit 350, that is, the supply voltage, is controlled to be turned off.

As described above, the output from the timer circuit 260 changes with the output level of the decoder circuit 266 during the power save mode. Therefore, in both power supply circuits 350 in FIGS. 2A and 2B, the generation and suspension of supply voltage are repeated in response to changes in the output level of the timer circuit 260.

An example wherein the supply voltage is controlled to be turned on and off every 1 second during the power save mode will next be described. If the oscillation frequency of the oscillation circuit 262 is 1 kHz (if one period is 1 msec.), the counter 264 is configured so that it is reset when the count value reaches "2000". The decoder circuit 266 is configured so that it outputs a signal of H level after the count value of the counter 264 counts to "1000" and a signal of L level after the count value of the counter 264 counts to "2000". As described above, during the power save mode, the power save control signal becomes H level, and the output of the AND gate 268 becomes identical to that of the decoder circuit 266. Thus, the ON/OFF signal supplied to the power supply circuit 350 changes its state between H and L when the count value from the counter 264 reaches "1000" and "2000", respectively. In this example, the power supply circuit turns the supply voltage on and off every 1 second. When the power save control signal is at L level indicating the normal operation mode, the output from the timer circuit 260 to the power supply circuit 350 is maintained at L level, and thus, the power supply circuit 350 continues to be turned on and generates supply voltages VDD1 and VDD2.

With the structure as described above, during the power save mode, the timer circuit 260 measures a predetermined period of time and the power supply circuit 350 can be controlled to be turned on and off at a regular interval. When the power supply circuit is turned off and the supply of the supply voltages VDD1 and VDD2 to the driving circuit 100 and LCD panel 200 of the display apparatus is suspended, the power consumption at the driving circuit 100 and LCD panel 200 can be shut off. Because the control to turn on the power supply circuit 350 is performed periodically, desired display can be seen during when the power supply circuit 350 is turned on, and thus, the user can view the display from time to time without any additional manipulation.

[Second Embodiment]

Figure 4:
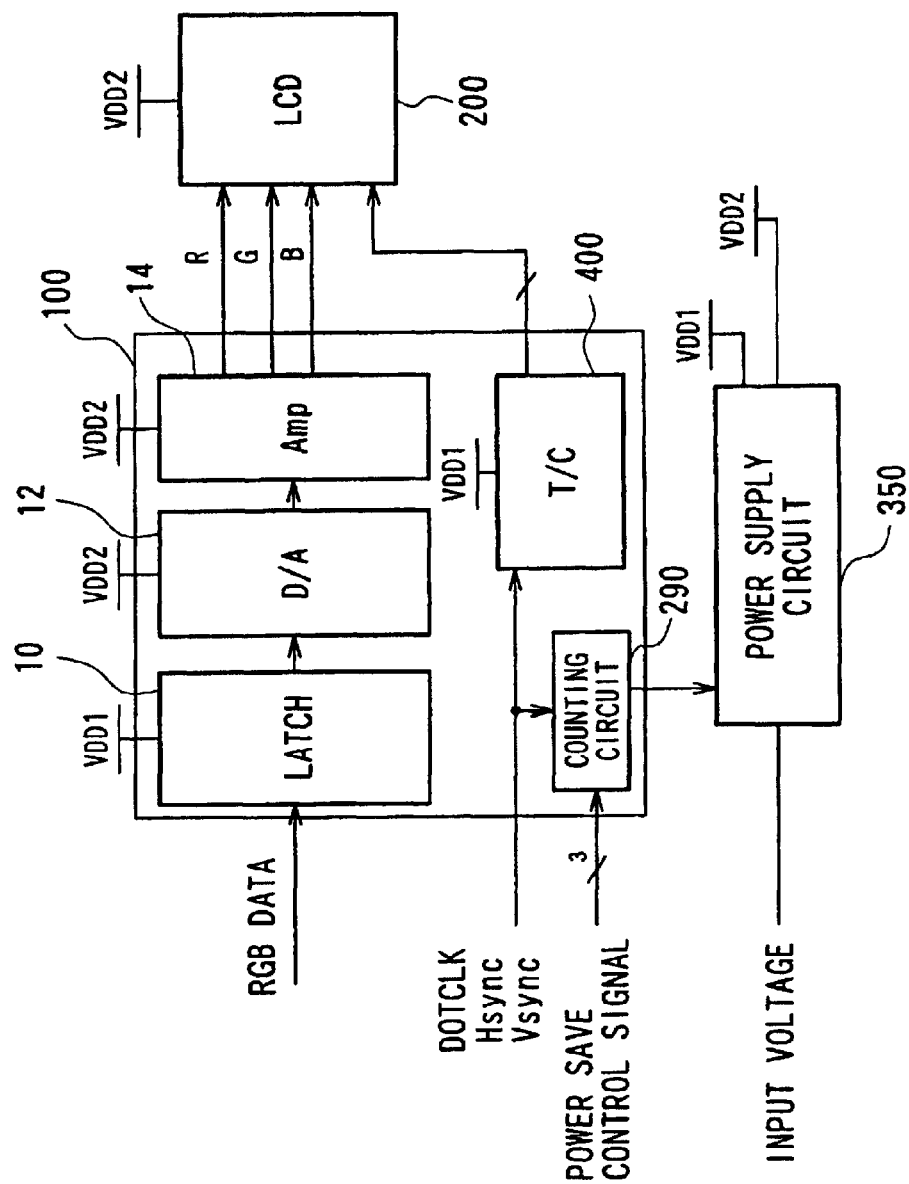
FIG. 4 is a diagram showing the structure of a display device according to a second embodiment of the present invention.

FIG. 4 shows schematically a structure of a display device with a power save mode according to a second embodiment of the present invention. A difference from the first embodiment is in the timer during the power save mode. In the second embodiment, a counting circuit 290 is provided in the driving circuit 100 as the timer. FIG. 5 shows a structure of the counting circuit 290. The counting circuit 290 comprises a counter 292 for counting a vertical synchronization signal Vsync, a decoder circuit 294 for analyzing the count value of the counter 292 and outputting a signal of H level or L level depending on the count value, and an AND gate 296. The output signal from the decoder circuit 294 is supplied to one input terminal of the AND gate 296 and a power save control signal is supplied to the other input terminal. Therefore, when the power save control signal is at H level indicating the power save mode, the output of the AND gate 296 follows the output level of the decoder circuit 294. When, on the other hand, the power save control signal is at L level indicating the normal mode, the output from the AND gate 296 is fixed at L level. Similar to the first embodiment, the output of the AND gate 296 is supplied to the power supply circuit 350 shown in FIG. 2A or 2B as an ON/OFF signal from the counting circuit 290.

A case where the supply voltage is controlled to be turned on and off every 60 frames as the power supply control timing during the power save mode will now be described as an example. As described above, the vertical synchronization signal Vsync is supplied to the counter 292. The counter 292 is configured so that it is reset when the count value reaches "120". The decoder circuit 294 is configured so that it outputs a signal of H level after the count value of the counter 292 counts to "60" and a signal of L level after the count value of the counter 292 counts to "120". During the power save mode, the power save control signal becomes H level, and the output of the AND gate 296 becomes identical to the output of the decoder circuit 294. Therefore, the ON/OFF signal supplied to the power supply circuit 350 changes its state between H and L levels when the count value of the counter 292 counts to "60" and "120" respectively, and the power supply circuit 350 is turned on and off every 60 frames. When the power save control signal is at L level indicting the normal operation mode, the output from the timer circuit 290 to the power supply circuit 350 is maintained at L level, and, thus, the power supply circuit 350 is continuously turned on and generates the supply voltages VDD1 and VDD2.

With the above structure, during the power save mode the power supply circuit 350 can be controlled to be periodically turned on and off with a predetermined period. By turning the power supply circuit off, the power consumption by the driving circuit 100 and LCD panel 200 can be stopped. In this manner, the user can periodically see the display even during the power save mode and without any further manipulation.

[Third Embodiment]

In the third embodiment, similar to the first and second embodiments, the supply voltages VDD1 and VDD2 are controlled to be periodically turned on and off during the power save mode. Further to this function, in the third embodiment, the output of a selection signal to selection lines (gate line) for selecting each pixel of the LCD 200 is suspended prior to the control of the supply voltage to turn off. Employing such a control can prevent deletion of the data written to each pixel until immediately before the off operation of the power supply, as may result from an uncontrolled output of a selection signal onto the selection lines after the power supply is turned off. In the LCD 200, because there is a capacitor component present in the pixels, the data signal written to each pixel during selection can be held for a predetermined amount of time even during the non-selection period, and the display can be continued for the predetermined period. In the third embodiment, by controlling the output of the selection signals to all the selection lines to be suspended in the display panel before the supply voltage is turned off, each pixel can be reliably placed in the non-selection state. With this configuration, even when the power supply is turned off, it is possible to maintain the display for a predetermined period after the timing when the pixels is put into the non-selection state, due to the function of the capacitor component of the pixels.

Figure 6:
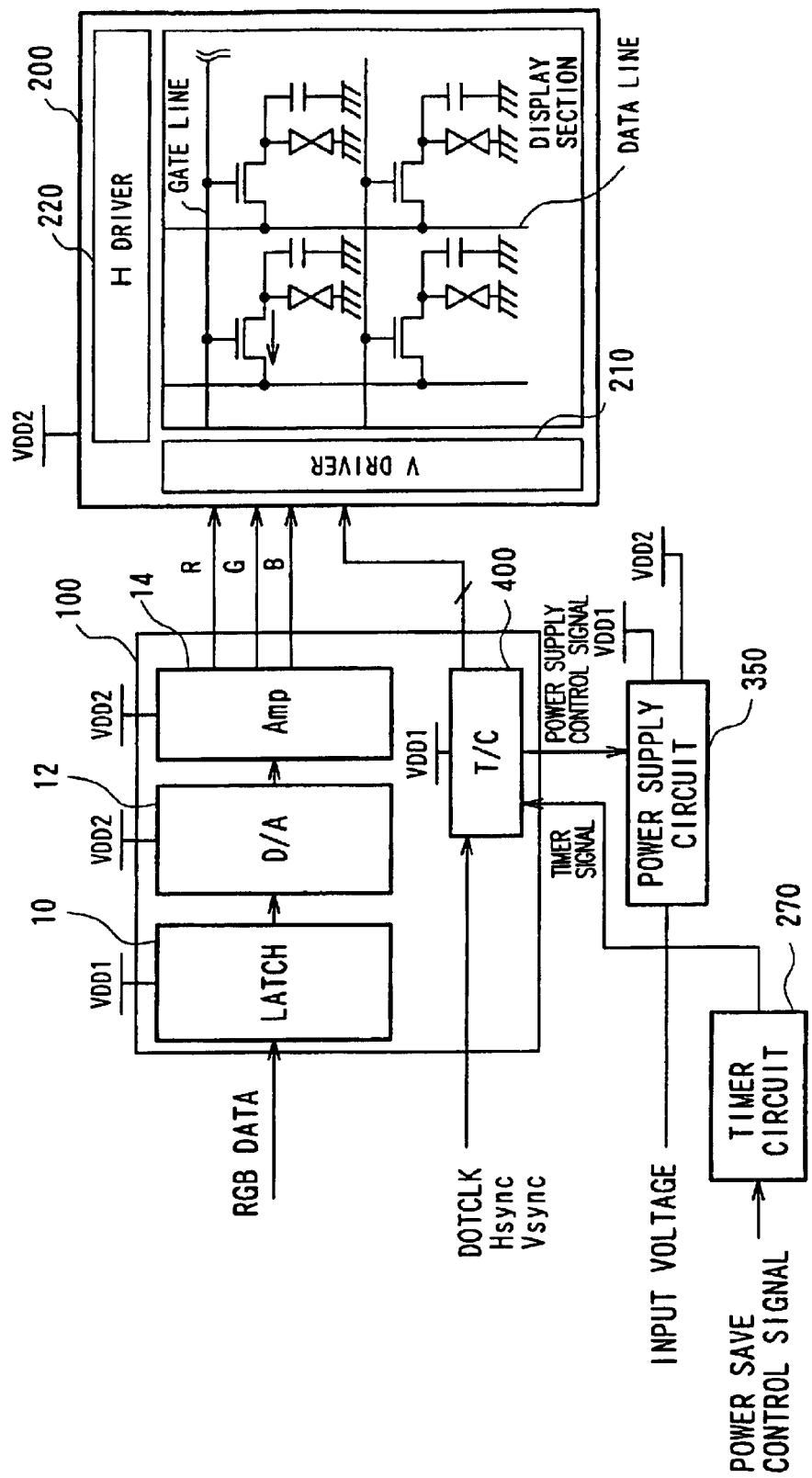
FIG. 6 is a diagram showing the structure of a display device according to a third embodiment of the present invention.

FIG. 6 shows an example configuration of an active matrix type LCD according to the third embodiment. Structures in FIG. 6 which are identical to structures explained for the first embodiment will be assigned the same reference numerals and will not be explained again here. In FIG. 6, a timer circuit 270 has a similar structure to that of the timer circuit 260 in the first embodiment. When the power save control signal is at H level indicating the power save mode, the timer circuit 270 outputs a timer signal which periodically changes between H level and L level with the period determined by a predetermined number of counts in the oscillation pulse by the counter 264 of FIG. 3. When the power save control signal is at L level indicating the normal operation mode, the timer signal from the timer circuit 270 is maintained at the L level.

The timer signal is supplied from the timer circuit 270 to the T/C 400 within the driving circuit 100. FIG. 7 shows a structure of the T/C 400. A dot clock signal (DOTCLK), a horizontal synchronization signal (Hsync), and a vertical synchronization signal (Vsync) are supplied to the T/C 400. Based on these signals, the T/C 400 produces a horizontal clock (CKH), a horizontal start pulse (STH), a pre-charge control (PCG), a gate line selection control signal (ENB), a vertical clock (CKV), a vertical start pulse (STV), and polarity inversion control signal (FRP), and supplies these signals to a V driver 210 and a H driver 220 of the LCD panel 200.

In the third embodiment, the timer signal from the timer circuit 270 is also supplied to the T/C 400. Using two-step FFs 52 and 53 and an AND gate 11, the output of each control signal to the LCD 200 is suspended, in response to the vertical synchronization signal Vsync, at the sweep period of the vertical period immediately after the timer signal is supplied. Then, after another vertical period is elapsed, the supply voltage is controlled to be turned off.

The structure and operation of the T/C 400 will now be described.

An H counter 12 receives the dot clock (DOTCLK) as the clock and counts the dot clock. Because the count value of the H counter 12 is reset by an output of the AND gate 31 having input of the horizontal synchronization signal (Hsync) which is output once every 1H period and the H reset signal (Hreset) from an 1H width control circuit 19 which is described below, the H counter 12 counts the dot clock during one H period.

The dot clock count value from the H counter 12 is decoded by a decoder 13, and the obtained pulse signal is output as a horizontal clock (CKH) via a flip-flop (FF) 20 and an AND gate 27. The horizontal clock is then supplied to the H driver of the LCD panel 200.

A decoder 14 generates a pulse for determining the start timing during each 1 horizontal scan period based on the dot clock count value from the H counter 12. This pulse is output as a horizontal start pulse (STH) via an FF 21.

A decoder 15 determines the timing immediately before the start of 1 horizontal period based on the dot clock count value from the H counter 12 and produces a pulse signal. The pulse signal is output as a pre-charge control signal (PCG) via an FF 22 for allowing the voltage of the data line to reach a voltage close to the display data voltage in the subsequent 1H period, before the start of 1 H.

A decoder 16 determines the timing for controlling selection allowance period of each gate line based on the dot clock count value from the H counter 12, and outputs the timing as a gate line selection control signal (ENB) via an FF 23. The control signal (ENB) is a control signal for prohibiting writing operation of the pre-charge data onto each pixel because a gate line is selected and the transistor is turned on during the pre-charge period performed on the data line immediately before 1 H. The gate line selection control signal (ENB) is supplied to the V driver 210 of the LCD panel 200.

Figure 8:
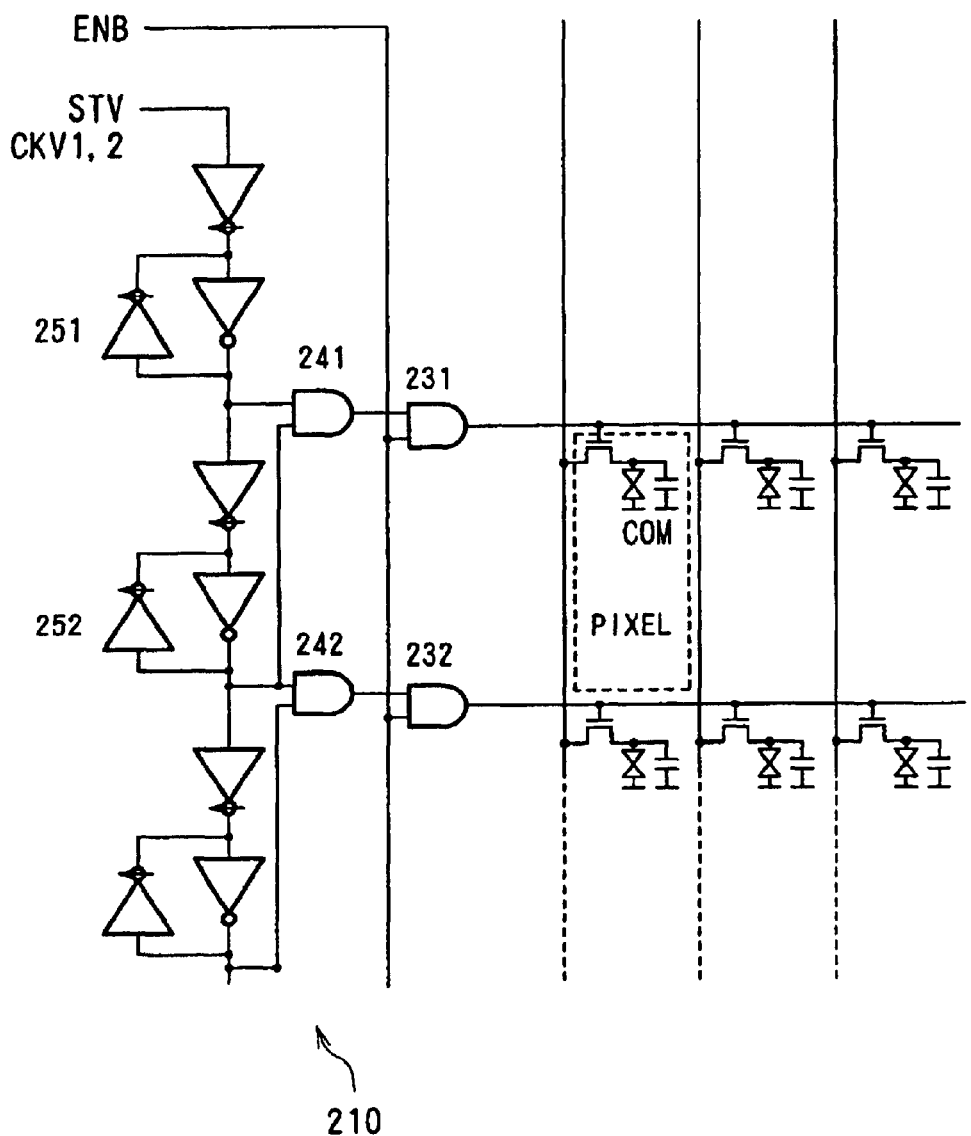
FIG. 8 is a diagram showing the structure of the V driver and display section in the LCD 200 depicted in FIG. 6.

The V driver 210 has a structure as shown in FIG. 8, and uses vertical clocks (non-inverted CKV1 and inverted CKV2 as described below), as the clocks, and corresponds to the number (n) of gate lines of the panel. The V driver 210 comprises multiple-step shift registers 251, 252, . . . for sequentially shifting the vertical start pulse (STV), AND gates 241, 242, . . . for outputting the logical product of the outputs of yth and (y+1)th shift registers, and final output gates 231, 232, . . . respectively for each gate line. The gate line selection control signal (ENB) is supplied to one input terminal of each of the final output gates 231, 232, . . . . The control signal (ENB) becomes L level during the pre-charge period which is immediately before the start of 1H period, and the output of the gate selection signal to the gate line is prohibited when the control signal (ENB) is at L level.

In FIG. 7, the output from a decoder 17 for decoding the dot clock count value from the H counter 12 is supplied to one input terminal of an AND gate 44 via an FF 24. The dot clock (DOTCLK) output via the AND gate 11 is supplied to the other input terminal of the AND gate 44. In the normal display state, the output of the AND gate 11 is identical to the dot clock and, thus, a signal which changes its level every 1H, is obtained from the Q terminal of an FF 41 which is supplied with the output of the AND gate 11 as the clock. The obtained signal is output to the V driver 210 of the LCD panel 200 as the vertical clock (CKV).

A decoder 18 generates a pulse signal based on the dot clock count value from the H counter 12. The pulse signal is supplied as one input to an AND gate 43 via an FF 25 for supplying a clock to an FF 40 for outputting an inversion control signal (FRP) for inverting the display data every 1 H.

The 1H width control circuit 19 generates an H reset signal (Hreset) once during a 1H period corresponding to one selection period of each gate line, and functions as a part of a V clock producing section along with an AND gate 32 and V counter 34 which is described below.

The V counter 34 receives the output of the AND gate 32 as a clock, and is reset by the output of an AND gate 33. The H reset pulse from the 1H width control circuit 19 and the dot clock (DOTCLK) supplied via the AND gate 11 are input to the AND gate 32. The V counter counts the pulse which becomes H once in 1H, and resets the count value in response to the vertical synchronization signal (Vsync) every 1V period.

A decoder 35 outputs the vertical start pulse (STV), which indicates the start of a 1V period, via an FF 37 once in 1 vertical scan period (1V) based on the count value from the V counter 34.

A decoder 36 outputs a V reset pulse (Vreset) via an FF 38, based on the count value from the V counter 34, when the count value reaches a value corresponding to the number of gate lines n of the LCD panel 200. The V reset signal (Vreset) is supplied to the reset terminal of the FF 40 to reset the inversion pulse (FRP) for inverting the polarity of the display data every 1H and 1 frame. The V reset signal is also supplied to the reset terminal of the FF 41 to reset the V clock (CKV). Furthermore, the V reset pulse is supplied to an AND gate 42 for obtaining the logical product between the V reset pulse and the dot clock (DOTCLK). An FF 39 receives the output of the AND gate 42 at its clock terminal and operates accordingly, so that a Q output which inverts every frame is obtained.

An EXOR gate 45 calculates the exclusive OR between the outputs of the FFs 39 and 40. The result is output to the H driver 220 of the LCD panel 200 as a polarity inversion pulse (FRP).

The control operation in the T/C 400 to turn off the power supply will now be described. The timer signal from the timer circuit 270 is supplied to the D terminal of the FF 52 provided in the T/C 400. The FF 52 receives the vertical synchronization signal Vsync at its CK terminal. Therefore, during the power save mode, when the timer signal supplied from the timer circuit 270 becomes H level (power off instruction), the FF 52 reads the timer signal when the next vertical synchronization signal Vsync is input. Thus, the Q output of the FF 52 becomes H level and the inverted Q output becomes L level. The inverted Q output is supplied to one input terminal of the AND gate 11 and the output of the AND gate 11 is thus fixed to L level when the inverted Q output becomes L level. In this manner, both of the counting operations at the H counter 12 and V counter 34 are suspended, and, as a result, the output of each of the control signals (CKH, STH, PCG, ENB, STV, FRP, CKV) are also suspended. In the V driver of the LCD 200 shown in FIG. 8, the transfer operations in shift registers 251, 252, . . . for sequentially transferring the gate selection signal in the V direction are suspended, and moreover, because the ENB becomes L level, the output of the selection signal to each gate line is prohibited.

As described, the output of each control signal to the LCD 200 and all selection signals to the gate lines from the V driver 210 are suspended when the next vertical synchronization signal Vsync is input after the timer signal is supplied, i.e., at the next vertical sweep period.

The FF 53 receives the same vertical synchronization signal Vsync at the clock terminal and Q output of the FF 52 at the D terminal. The FF 53 reads the Q output of the FF 52 at the H level when the next vertical synchronization signal Vsync is supplied. The Q output of the FF 53 is supplied to the power supply circuit 350 as a power supply control signal, as shown in FIG. 6.

At the power supply circuit 350, similar to the first embodiment, when an ON/OFF signal of H level is supplied during the power save mode, the supply voltage is controlled to be turned off. According to the structure shown in FIG. 7, the control signals to the LCD 200 are suspended, and then, after one vertical period is elapsed, the supply voltage is controlled to be turned off.

In an active matrix type LCD, the data signal being supplied to the data line when the TFT is controlled to be turned on by a selection signal (gate signal) is written to and maintained at the liquid crystal capacitor and the storage capacitor of each pixel via the TFT. Therefore, even after the TFT is turned off, the data is maintained for a predetermined period, and, thus, the display is also maintained. Therefore it is possible to prevent the TFT from being turned on in an uncontrolled condition, even when the power supply is controlled to be turned off during a power save mode, as in the third embodiment, by first suspending the output of the selection signals to the gate lines and then controlling the supply voltage to be turned off. The display which is shown until immediately before the operation to turn off the supply voltage can be maintained for a predetermined period even after the supply voltage is controlled to be turned off, similar to the non-selection period of the TFT during the normal operation.

In the above description, a structure is shown where T/C 400 suspends all control signals to the LCD 200 and then controls the supply voltage to turn off. However, it is also possible to use only the ENB output from the FF 23 of FIG. 7 to prohibit the output of the selection signal onto the gate lines.

Moreover, in the structure shown in FIG. 7, the vertical blanking period is judged using the vertical synchronization signal Vsync in order to suspend the generation of the control signals at the vertical blanking period after the timer signal is input. However, the structure is not limited to this configuration, and a separate signal for judging the vertical blanking period may be produced and used.

In the above description, the period between the suspension of the generation of the control signal to the LCD 200 and the off-control of the supply voltage at the power supply circuit 350 is set as one vertical period. The period between the suspension of the control signals and power off control, however, is not limited to this vertical period.

In the third embodiment, the periodical on and off control of the supply voltage during the power save mode is performed similar to that in the other embodiments. In the structure shown in FIG. 7, the on-control of the power supply during the power save mode is automatically performed when the timer signal becomes L and this change is latched by the FF 52 at the next rise of the vertical synchronization signal Vsync. In other words, by latching the timer signal of L level, the inverted Q output becomes H level, and the output of the dot clock, DOTCLK, to each counter from the AND gate 11 is enabled. At the next timing of vertical synchronization signal Vsync, the Q output of the FF 53 becomes L level. Because the Q output is supplied to the power supply circuit 350, the supply voltage is controlled to be turned on.

As described, with the control described in the third embodiment, the power supply can be controlled to periodically turn on and off during the power save mode, and, at the same time, the display immediately before the power supply is turned off can be maintained for a predetermined amount of time when the power supply is turned off.

What is claimed is:

1. A driving device for a display device comprising:
   a driving circuit for driving a display panel onto which a plurality of pixels are formed: and
   a power supply circuit for generating supply voltage for said display panel and said driving circuits; wherein
      when power save is instructed, the supply voltage supply to one or both of said display panel and said driving circuit is controlled to be turned on and off with a predetermined period;
      said display panel comprises a plurality of pixels, selection lines for selecting the pixels, and data lines for supplying data to the pixels;
      said driving device further comprises a suspension controller for suspending, when a power save is instructed, the output of all selection signals onto said selection lines for selecting the pixels to which data is written; and
      said supply voltage is controlled to be turned off after said suspension controller has suspended the output of said selection signals.

2. A driving device for a display device according to claim 1, further comprising a timer, and wherein said power supply circuit turns the supply voltage on and off in response to the time measurement result by said timer.

3. A driving device for a display device according to claim 1, wherein
   each of said plurality of pixels includes a display element and a transistor for driving the display element.

4. A driving device for a display device according to claim 1, wherein
   said control to turn off the supply voltage is performed after one vertical scan period is elapsed from the suspension of the output of said selection signals by said suspension controller.

5. A driving device for a display device according to claim 4, wherein
   each of said plurality of pixels includes a display element and a switching element for driving the display element.

6. A driving device for a display device according to claim 1, wherein said display device is a liquid crystal display device.

* * * * *